(12) United States Patent
Palm

(10) Patent No.: US 6,793,118 B2
(45) Date of Patent: Sep. 21, 2004

(54) LASER SUPPORTED FRICTION STIR WELDING METHOD

(75) Inventor: Frank Palm, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 41 days.

(21) Appl. No.: 10/333,830

(22) PCT Filed: Jul. 19, 2001

(86) PCT No.: PCT/EP01/08345
§ 371 (c)(1),
(2), (4) Date: Jan. 23, 2003

(87) PCT Pub. No.: WO02/07924
PCT Pub. Date: Jan. 31, 2002

(65) Prior Publication Data
US 2004/0020970 A1 Feb. 5, 2004

(30) Foreign Application Priority Data
Jul. 25, 2000 (DE) .......................... 100 36 170

(51) Int. Cl.$^7$ ............................................. B23K 20/12
(52) U.S. Cl. .................................... 228/112.1; 228/2.1
(58) Field of Search .............................. 228/112.1, 2.1; 428/615

(56) References Cited

U.S. PATENT DOCUMENTS

| | | | |
|---|---|---|---|
| 5,460,317 A | 10/1995 | Thomas et al. | 228/112.1 |
| 5,813,592 A | 9/1998 | Midling et al. | 228/112.1 |
| 6,311,889 B1 * | 11/2001 | Ezumi et al. | 228/112.1 |
| 6,457,629 B1 * | 10/2002 | White | 228/112.1 |
| 2002/0125297 A1 * | 9/2002 | Stol et al. | 228/112.1 |
| 2003/0111515 A1 * | 6/2003 | Scheglmann et al. | 228/112.1 |
| 2003/0116608 A1 * | 6/2003 | Litwinski | 228/112.1 |
| 2003/0205565 A1 * | 11/2003 | Nelson et al. | 219/148 |
| 2004/0004107 A1 * | 1/2004 | Litwinski | 228/56.3 |
| 2004/0020970 A1 * | 2/2004 | Palm | 228/112.1 |
| 2004/0041006 A1 * | 3/2004 | Masingale | 228/112.1 |
| 2004/0046003 A1 * | 3/2004 | Vyas | 228/112.1 |
| 2004/0050906 A1 * | 3/2004 | Rice et al. | 228/112.1 |

FOREIGN PATENT DOCUMENTS

| | | |
|---|---|---|
| EP | 0615480 | 11/1995 |
| EP | 0752926 | 5/1998 |
| EP | 0928659 | 7/1999 |
| JP | 410225781 A * | 8/1998 |
| JP | 2003080381 A * | 3/2003 |
| WO | 9939861 | 8/1999 |
| WO | WO 02/07924 A1 * | 1/2002 |
| WO | WO 02/074479 A1 * | 9/2002 |

* cited by examiner

Primary Examiner—Kiley Stoner
(74) Attorney, Agent, or Firm—Davidson, Davidson & Kappel, LLC

(57) ABSTRACT

A laser-assisted friction stir welding method for joining workpieces, that includes the step of providing a side face for each workpiece between first and second workpiece surfaces, each side face shaped such that, in a pressed-together condition, the side faces touch each other at the second workpiece surface and are spaced from each other in a middle region of the side faces so that a gap exists between the side faces at the first workpiece surface. The method also includes pressing together the side faces so as to form a joint area, and advancing a welding probe, while the probe is in rotary motion, along the joint area at the first workpiece surface and irradiating workpiece material located in front of the welding probe using laser radiation so as to plasticize the workpiece material along the joint area. The method also includes removing the welding probe from the joint area before the workpiece material completely solidifies.

10 Claims, 2 Drawing Sheets

LASER SUPPORTED FRICTION STIR WELDING METHOD

BACKGROUND

The present invention relates to a laser-assisted friction stir welding method for joining workpieces.

The basic principles of friction stir welding (FSW) are known, for example, from European Patent EP 0 615 480. Two workpieces to be joined are brought into contact along a joint area, held and secured in this position. A probe of a harder material than the workpiece is plunged into the joint area and into the workpiece material on both sides of the joint area while being in rotary motion. In the process, the probe generates frictional heat. Thereupon, the opposing workpiece regions along the joint line assume a plasticized state. The probe is moved forward along the joint line so that the material of opposing workpiece regions which is located in front of the probe is plasticized and the plasticized regions behind the probe solidify. The probe is removed from the joint area before the material completely solidifies. Materials such as metals, alloys thereof, metal composite materials (so-called "MCC") or suitable plastic materials are welded together in this manner.

A further, improved friction stir welding method whereby a smaller number of defects and a smooth surface of the processed material are achieved is known, for example, from European Patent EP 0 752 926. This publication describes a modified probe arrangement. The rotating probe which is plunged into the joint area is tilted with respect to the vertical so that the probe points in the direction of forward movement. Because of this, the plasticized material created in the joint area is exposed to a perpendicular pressure along the surface of the workpieces. This leads to improved material flow, thus resulting in a more homogeneous weld. In this manner, it is possible to make joints having a smaller number of defects and a smooth surface.

Another friction stir welding method is known, for example, from World Patent WO 99/39861, which describes a method in which an additional heat source is used. The heat source is used to heat the region immediately in front of the rotating probe. This results in a more effective plasticization of the material because not only the frictional heat of the rotating probe is used but also the additional heating of the separate heat source. Additional heat sources that can be used include, for example, resistance heaters, induction coils, high-frequency induction coils or lasers.

The use of resistance heaters is disadvantageous because of the relatively high electric currents flowing between the tool and the workpiece. Even with good protection, an impairment of the environment, in particular of people, cannot be ruled out. Furthermore, electrically conductive materials for the workpiece and the tool are a prerequisite. Consequently, it is not possible for the FSW tool to be desirably formed of coated, metallic or ceramic materials.

In addition, the known methods have the disadvantage that often only a limited process speed is permitted, depending on the Al alloy to be joined. This is problematic, in particular, when processing thick workpieces (typically>6 mm). In the case of thick workpieces, there is also the problem of asymmetric or uneven heat conduction within the workpiece material so that the known methods are unsuitable for processing workpieces of that kind.

An object of the present invention is to provide a method for friction stir welding which allows short welding times and an excellent joint quality, in particular in the case of thick workpieces.

SUMMARY OF THE INVENTION

The present invention provides a laser-assisted friction stir welding method for joining workpieces, that includes the step of providing a side face for each workpiece between oppositely facing first and second workpiece surfaces, each side face shaped such that, in a pressed-together condition, the side faces touch each other at the second workpiece surface and are spaced from each other in a middle region of the side faces and so that a gap exists between the side faces at the first workpiece surface. The method also includes pressing together the side faces so as to form a joint area, and advancing a welding probe, while the probe is in rotary motion, along the joint area at the first workpiece surface and irradiating workpiece material located in front of the welding probe using laser radiation so as to plasticize the workpiece material along the joint area. The method also includes removing the welding probe from the joint area before the material completely solidifies.

In this context, the abutting faces of the workpieces to be joined together have a special shape so that the energy that is additionally radiated from a laser is effectively used for the heating of the material to be plasticized. To this end, the workpiece sides to be joined are designed in such a maimer that, in the pressed-together condition, the side faces touch each other in the root region of the joint profile, that a gap is present between the pressed-together side faces at the workpiece surface facing toward the tool and the laser, and that the joint profile has a clearance or hollow space in the middle region. In this manner, the unwanted back-reflection of the laser radiation at the workpiece surface is markedly reduced or completely avoided. Moreover, due to the adapted side faces it is achieved that the laser energy centrally enters the middle region of the workpieces and from there is uniformly distributed over the entire cross-section because of heat conduction. This allows a much more efficient heating of the workpiece material and is advantageous, in particular when processing specimens that are thicker than 6 mm.

According to a first embodiment of the present invention, the to-be-joined side faces of the workpieces are beveled in such a manner that the workpieces touch each other in the root region of the joint profile and a gap is present between the side faces at the workpiece surface facing toward the tool and the laser, i.e., the workpiece surface opposite the root region.

According to a second embodiment of the present invention, the to-be-joined side faces of the workpieces are beveled in the shape of a parabola or an arc and touch each other in the root region of the joint profile. Starting at the root region, the side faces are spaced from each other by the bevel, the clearance increasing in the direction of the workpiece surface facing toward the tool and the laser.

According to a further embodiment, the to-be-joined side faces of the workpieces have a semicircular or arched profile as viewed in the cross-section of the joint so that, in the pressed-together condition, the workpieces touch each other in the root region and a gap is present between the side faces at the workpiece surface facing toward the laser. In this case, the clearance between the side faces initially increases, starting at the root region, and then decreases toward the workpiece surface from the maximum in the middle region to the value of the gap width.

According to a further embodiment, the to-be-joined side faces of the workpieces are formed in such a manner that, in the pressed-together condition, the joint profile of the side faces has the shape of a so-called "beam trap" ("Ulbrich sphere").

Using the method according to the present invention, the regions to be plasticized are heated in a more effective and more uniform manner, as a result of which faster joining speeds and better joint quality are achieved. Due to the higher local workpiece and process temperature, on one hand, the process forces decrease because of the better plasticization and, on the other hand, the joining speed is increased. This is an advantage especially for joining thick cross-sections. Thus, the application area for the FSW method is increased.

It is also beneficial that the method according to the present invention offers more processing reliability and, moreover, involves a reduction in load for the FSW process machines. In the long term, therefore, it is also possible to save costs in production.

BRIEF DESCRIPTION OF THE DRAWINGS

In the following, the method according to the present invention will be explained in greater detail with reference to the attached drawings, in which.

DETAILED DESCRIPTION

Figure 1:
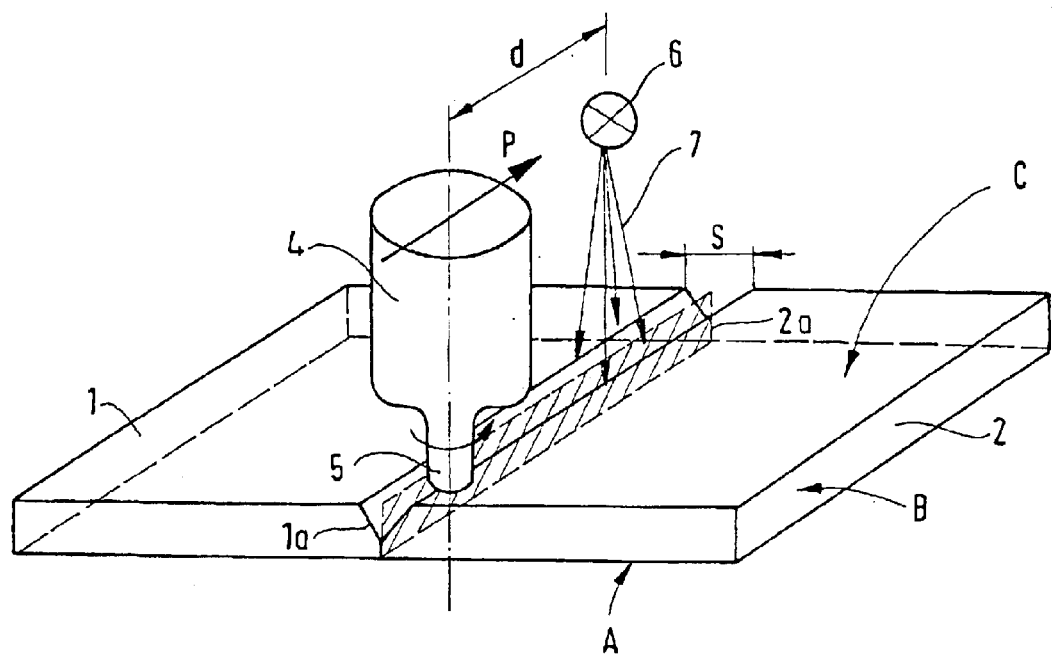
FIG. 1 is a schematic representation of an arrangement for laser-assisted friction stir welding.

FIG. 1 schematically shows an arrangement for laser-assisted friction stir welding. Workpieces 1 and 2 to be jointed are pressed together along their side faces 1a and 2a, respectively. Pressed-together workpieces 1, 2 are secured and held in this condition by a holding device not shown in FIG. 1. A rotating probe 5 is plunged into the workpiece material in joint area 3 between pressed-together side faces 1a, 2a so that probe 5 penetrates into the workpiece material on both sides of joint area 3. Probe 5 is attached to one end of FSW tool 4 and is composed of a harder material than the workpiece. FSW tool 4 with probe 5 is driven by a motor not shown in FIG. 1.

In addition, a laser light source 6 is located in front of FSW tool 4 as viewed in the feed direction (direction of arrow P in FIG. 1). Laser light source 6 has a predetermined, firmly defined distance d from tool 4. Constant distance d between tool 4 and laser light source 6 is ensured, for example, by a guiding or holding device not shown in FIG. 1. Laser light source 6 emits laser radiation 7 in continuous or pulsed mode in the direction of workpieces 1, 2 to be joined. This results in a preheating of the workpieces to be joined along joint area 3.

The welding process is carried out in such a manner that FSW tool 4 is moved along joint area 3 in the feed direction (direction of arrow P in FIG. 1) with probe 5 being in rotary motion. Due to fixed distance d between tool 4 and laser light source 6, laser 6 is moved along joint area 3 in the direction of arrow P just as tool 4. Due to rotating probe 5, the workpiece material is plasticized on both sides of joint area 3 because of the arising frictional energy. At the same time, the material to be joined is heated along joint area 3 by laser radiation 7 ahead of FSW tool 4. Thus, in addition to the frictional heat generated by probe 5, the heating by laser radiation 7 is utilized as well. The frictional heat and the preheating together result in a higher local workpiece and process temperature. Consequently, on one hand, the process forces decrease because of the better plasticization and, on the other hand, the joining speed can be increased; that is, it is possible to join thicker cross-sections (>6 mm).

Figure 2:
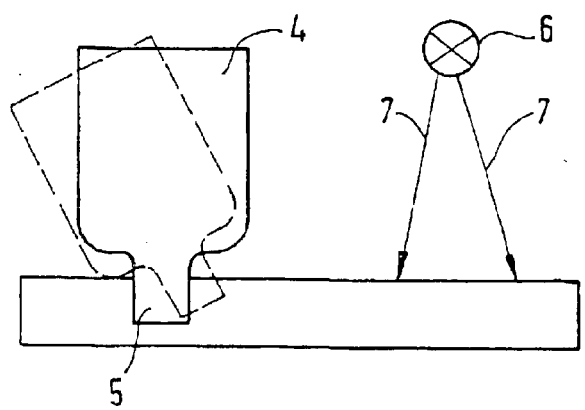
FIG. 2 is a lateral view of the arrangement shown in FIG. 1.

As shown in FIG. 2, FSW tool 4 is aligned perpendicular to the workpiece surface. An inclined positioning of tool 4 and probe 5, as shown by the broken line in FIG. 2, is also possible. In case of an inclined positioning, probe 5 points to the front, as viewed in the feed direction, i.e., in the direction of laser 6. Such an inclined positioning results in a better flow of the plasticized material, thus allowing a visually more beautiful and more homogeneous joint of workpieces 1, 2 to be joined.

Used as laser source 6 are, for example, a $CO_2$ Laser, a neodymium-YAG laser, or various semiconductor lasers (diodes). The laser light wavelength used is typically $\leq 10.6$ μm. The laser light can be radiated onto the region to be heated along joint line 3 in either pulsed or continuous mode. The beam is focused or defocused, depending on the application.

Figure 3:
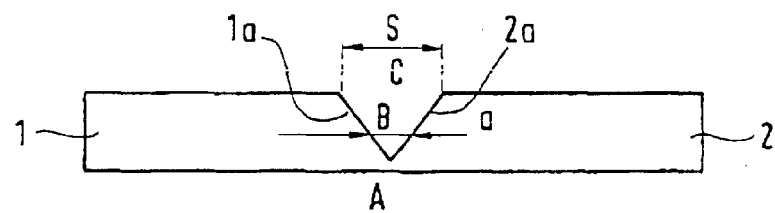
FIG. 3 shows a first profile geometry of the adapted side faces in the pressed-together condition.

In order for the incident laser light to be used as effectively as possible (i.e., increased absorption by multiple reflection), pressed-together side faces 1a, 2a have a special shape. A first embodiment is shown in FIG. 3. The side faces of workpieces 1 and 2 are beveled. Side faces 1a, 2a are beveled, for example, in a linear fashion, resulting in the conical joint profile depicted in FIG. 3. In the pressed-together condition, side faces 1a and 2a of the workpieces touch each other in the so-called "root region" of the joint profile. In this context, the root region is the workpiece surface region which faces away from tool 4 and laser 6 and is denoted by A in FIGS. 3 through 6. In the case of such a conical joint profile, pressed-together side faces 1a and 2a do not touch each other in the middle region of the joint profile, i.e., in the middle of the cross-section of the workpieces, which is denoted by B in FIGS. 3 through 6. At the same time, there is a gap S between side faces 1a, 2a at the workpiece surface which faces toward tool 4 and laser 6 and is denoted by C in FIGS. 3 through 6. Thus, the side faces are spaced from each other in such a manner that, starting at the root region, clearance a between side faces 1a, 2a continuously increases in the direction of the workpiece surface facing toward tool 4 and laser 6. Laser radiation 7 emitted by laser 6 enters middle region B of the joint profile via gap S so that the additional heat is generated by absorption and passed on directly in the joint.

Figure 4:
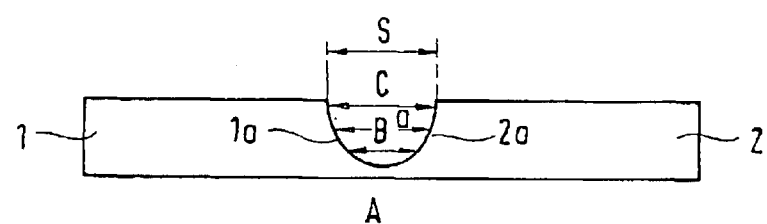
FIG. 4 shows a second joint profile of the adapted side faces in the pressed-together condition.

Another design of adapted side faces 1a, 2a can be seen in FIG. 4. The joint profile depicted in FIG. 4 has the shape of a semicircular or symmetric arc which is open toward tool 4 and laser 5. To this end, side faces 1a, 2a are each beveled in the shape of a parabola or an arc so that, in the pressed-together condition, the workpieces touch each other in root region A. Again, a clearance or hollow space exists in middle region B. In this region, the side faces of pressed-together workpieces 1, 2 do not touch each other. Similarly to the embodiment shown in FIG. 3, a gap S exists between pressed-together side faces 1a, 2a at the workpiece surface facing toward tool 4 and laser 6, which will allow the laser radiation to reach middle region B. As before, clearance a between side faces 1a, 2a increases continuously from root region A until gap width S is reached.

Figure 5:
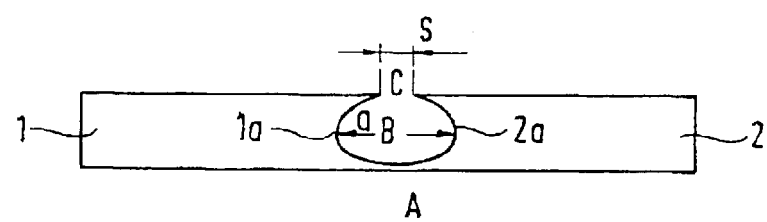
FIG. 5 shows a third joint profile of the adapted side faces in the pressed-together condition.

FIG. 5 shows a further joint profile of adapted side faces 1a, 2a. Here, side faces 1a, 2a are formed in a semicircular shape, or rather in the shape of open arcs facing toward the respective other side face. Here too, side faces 1a, 2a touch each other in root region A. Due to the semicircular or arched design of side faces 1a, 2a, there is an initially continuously increasing clearance a between opposing side faces 1a, 2a, which starts at root region A and, after reaching its maximum in middle region B, continuously decreases until gap width S is reached at workpiece surface C.

Figure 6:
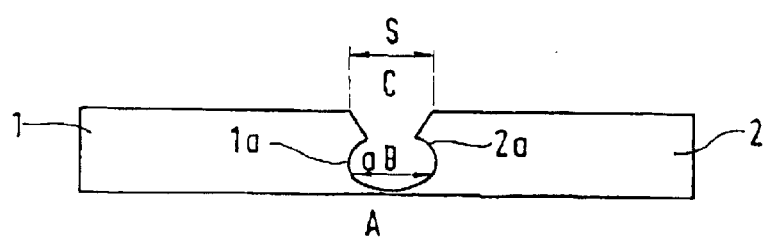
FIG. 6 shows a fourth joint profile of the adapted side faces in the pressed-together condition.

In the embodiment according to FIG. 6, side faces 1a, 2a to be joined are formed in such a manner that the joint profile has the shape of an Ulbrich sphere. Such a design has the advantage that the reflection at the surface side facing toward the tool and the laser is completely reduced. The laser radiation is, as it were, trapped in the Ulbrich sphere. The laser beam incident into middle region B is multiply reflected so that the laser energy is optimally utilized for heating the material to be plasticized.

In addition to the joint profiles shown in FIGS. 3 through 6, other embodiments of the adapted side faces are possible as well. All embodiments have in common that the pressed-together side faces touch each other in the root region but not in the middle and upper regions so that the side faces are spaced from each other in the middle and upper regions. In the pressed-together condition, side faces 1a, 2a are spaced from each other at surface C facing toward tool 4 and laser 6, so that a gap S exists. Laser radiation 7 enters middle region B of the workpieces via this gap s. In this manner, the energy of the laser light centrally reaches the middle of workpieces 1, 2 and is then uniformly distributed over the entire cross-section of workpieces 1, 2. This is an advantage especially for thicker specimens because in this manner, the heat is distributed more uniformly over the entire specimen thickness. In this manner, a reliable processing is also ensured for thicker specimens.

Moreover, the special form of side faces 1a, 2a causes laser radiation 7 to be multiply reflected in middle region B, as a result of which reflection losses at the workpiece surface facing toward the laser are reduced. Due to the lower losses, the heating is therefore more effective. This is an advantage especially when processing thick workpieces. Furthermore, the combination of frictional heat and the preheating allows faster processing, reducing the production and processing times. This, in turn, has a positive influence on the plasticization so that a homogeneous joint is achieved.

What is claimed is:

1. A laser-assisted friction stir welding method for joining workpieces, the method comprising:

providing a side face for each workpiece between first and second workpiece surfaces, each side face shaped such that, in a pressed-together condition, the side faces touch each other at the second workpiece surface and are spaced from each other in a middle region of the side faces so that a gap exists between the side faces at the first workpiece surface;

pressing together the side faces so as to form a joint area;

advancing a welding probe, while the probe is in rotary motion, along the joint area at the first workpiece surface and irradiating workpiece material located in front of the welding probe using laser radiation, the advancing of the welding probe performed so as to plasticize the workpiece material along the joint area; and removing the welding probe from the joint area before the workpiece material completely solidifies.

2. The method as recited in claim 1 wherein the workpiece material is plasticized due to a laser energy and a frictional energy between the welding probe and the workpieces.

3. The method as recited in claim 1 wherein the side faces are beveled in a linear fashion.

4. The method as recited in claim 1 wherein the side faces are beveled in the shape of a parabola or an arc.

5. The method as recited in claim 1 wherein the side faces are shaped in such a manner that a joint profile formed by the pressed-together side faces has a circular or elliptical shape.

6. The method as recited in claim 1 wherein the side faces are shaped in such a manner that a joint profile formed by the pressed-together side faces has a shape of a beam trap.

7. The method as recited in claim 1 wherein the laser radiation is emitted by at least one of a $CO_2$ laser, a neodymium-YAG laser, a semiconductor laser, and a laser diode.

8. The method as recited in claim 1 wherein a wavelength of the laser radiation is smaller than or equal to 10.6 $\mu$m.

9. The method as recited in claim 1 wherein the laser radiation is focused or defocused in at least one of a circular, elliptical, or linear manner.

10. The method as recited in claim 1 wherein the laser radiation is emitted in at least one of a pulsed or a continuous mode.

* * * * *